US005642104A

United States Patent [19]
Erwin

[11] Patent Number: 5,642,104
[45] Date of Patent: Jun. 24, 1997

[54] AUDIBLE ALERT FOR AUTOMATIC SHUTOFF CIRCUIT

[75] Inventor: William Randall Erwin, Rowlett, Tex.

[73] Assignee: The Genlyte Group Incorporated, Secaucus, N.J.

[21] Appl. No.: 765,596

[22] Filed: Sep. 26, 1991

Related U.S. Application Data

[63] Continuation-in-part of Ser. No. 752,004, Aug. 29, 1991, Pat. No. 5,194,858.

[51] Int. Cl.$^6$ .................................................. G08C 19/00
[52] U.S. Cl. ............................. 340/825.72; 340/825.37; 340/529; 340/309.15; 307/141
[58] Field of Search ........................ 340/825.72, 825.37, 340/527, 528, 529, 565, 566, 567, 309.15, 309.2, 309.5, 309.6, 322; 307/116, 117, 141, 141.4

[56] References Cited

U.S. PATENT DOCUMENTS

| | | | |
|---|---|---|---|
| 3,842,403 | 10/1974 | Konopka | 340/825.69 |
| 4,090,107 | 5/1978 | Seib | 307/114 |
| 4,223,301 | 9/1980 | Grimes et al. | 340/825.37 |
| 4,367,455 | 1/1983 | Fried | 340/825.37 |
| 4,426,639 | 1/1984 | Jessup | 340/322 |
| 4,538,973 | 9/1985 | Angott et al. | 307/825.69 |
| 4,563,592 | 1/1986 | Yuhasz et al. | 307/140 |
| 4,636,774 | 1/1987 | Galvin et al. | 307/117 |
| 4,716,301 | 12/1987 | Willmott et al. | 307/115 |
| 4,751,399 | 6/1988 | Koehring et al. | 340/529 |
| 4,823,021 | 4/1989 | Shimada et al. | 307/112 |
| 4,864,482 | 9/1989 | Quazi et al. | 363/37 |
| 5,153,580 | 10/1992 | Pollack | 340/309.15 |

*Primary Examiner*—Jeffery Hofsass
*Assistant Examiner*—Andrew Hill
*Attorney, Agent, or Firm*—Dennis T. Griggs

[57] ABSTRACT

An automatic lighting controller applies a turn-off control signal to a gate controlled power switch for switching OFF lighting when a timer circuit determines that motion activity above a threshold level has not occurred within the controlled area during a prescribed interval. A counter produces a grace period count signal and a reset count signal, with the grace period count signal occurring within a predetermined sub-interval, for example, one count cycle prior to the reset count signal. The grace period count cycle (N–1) interval is adjustable, for example, from about 0.6 second (for test purposes) to about 14 seconds. The grace period count signal enables an audio transducer which provides an audible alert that the lights are about to be switched OFF automatically. A person in the controlled area can override the impending automatic shutoff simply by initiating some motion activity during the grace period.

8 Claims, 4 Drawing Sheets

AUDIBLE ALERT FOR AUTOMATIC SHUTOFF CIRCUIT

REFERENCE TO RELATED APPLICATIONS

This application is a continuation-in-part of U.S. application Ser. No. 07/752,004, filed Aug. 29, 1991, entitled "Lighting Control System With Set/Reset Ground Remote", by William Randall Erwin, now U.S. Pat. No. 5,194,858. That application discloses a dual mode power supply and switch control logic circuit which are used in the preferred embodiment of the present invention.

This application is related to co-pending U.S. application Ser. No. 07/484,066, filed Feb. 23, 1990, entitled "Preset Light Controller Including Infrared Sensor Operable In Multiple Modes", by Raymond T. Griffin and Steven R. Carson, now U.S. Pat. No. 5,128,654. That application discloses an infrared sensor circuit for motion detection which is used in the preferred embodiment of the present invention.

Both related applications are assigned to the assignee of the present invention, and are hereby incorporated by reference.

FIELD OF THE INVENTION

This invention relates generally to systems for controlling the application of electrical power to a load, and in particular to a lighting control system of the type having a motion sensor for automatically turning off a lighting load in the absence of motion activity within a controlled area.

BACKGROUND OF THE INVENTION

Automatic switch controllers are now available for applying power to lighting in response to external stimuli, for example, motion activity within a defined area, or rise/fall of outside ambient light level. In interior lighting applications, automatic switch controllers have an infrared thermal energy sensor for automatically switching off the lighting in the absence of motion activity over a predetermined period of time after everyone has left the controlled area. It will be appreciated. that considerable energy savings may be realized by automatically turning off interior lighting when the room is not occupied.

Automatic lighting control units which include a motion sensor provide the desired control flexibility to accommodate irregular working hours, and make lighting available for a controlled area as long as motion activity of any kind is sensed within a predetermined time interval. Such automatic control units are wire-for-wire replaceable with standard ON/OFF switches, with the operating power for the controller being derived from the hot conductor of an AC power distribution system.

DESCRIPTION OF THE PRIOR ART

Automatic lighting control circuits which include a motion sensor also include a timer which defines the interavl during which movement must be detected or the AC operating power to the interior lights will be interrupted. The timing interval is variable to allow for short periods of inactivity without operating power being switched off. The timing interval may be adjustable over a range of from about forty seconds to about fifteen minutes, for example, to permit a person to leave the controlled area or to remain inactive for short periods without the lights being interrupted.

Motion detectors which utilize an infrared sensor must be able to ignore various low level sources of infrared thermal energy within the controlled area, such as sunlight conducted into the controlled area through a window or skylight, infrared energy associated with conditioned air being circulated through the controlled area, and infrared energy generated by machines and appliances which operate within the controlled area. Consequently, the motion detector must be set to respond to motion activity which exceeds a predetermined threshold value which corresponds generally with thermal energy associated with the activities of at least one person, and must also be set to exclude thermal energy signals from spurious sources which do not rise above a predetermined low threshold level.

An automatic lighting control circuit which utilizes a timer to provide a period during which movement must be detected or the lights will be switched off is disclosed in U.S. Pat. No. 4,751,399 to Kochring, et al. In that arrangement, an acoustic transmitter and receiver are adjusted to detect movement which exceeds a predetermined threshold level within an area served by a light during a first time interval, a circuit for switching off the light when the detection circuit determines that movement has not taken place within the controlled area during the first time interval, and a circuit for automatically switching on the light in response to a signal indicating movement within the controlled area within a second preselected interval following automatic turn-off of the light.

A limitation on the use of Kochring's circuit is that the lights will be switched off without warning, thereby interrupting activities within the room, and possibly imposing a risk of personal injury or property damage because of the lack of adequate illumination. Moreover, the use of such a system which provides no warning that the lights may suddenly be switched off may cause some persons to experience stress or anxiety, with the result that personal relaxation and concentration may be impaired because of the perceived need to maintain constant activity to avoid inadvertent shutoff of the lights.

OBJECTS OF THE INVENTION

The principal object of the present invention is to provide an improved automatic lighting controller of the type which is operable to switch off lights in the absence of motion activity within a controlled area during a prescribed interval, which provides a warning signal that the controlled lighting is about to be switched off automatically.

A related object of the present invention is to provide an improved lighting control circuit of the character described which provides a grace period and concurrent warning signal which allows adequate time for a person in the controlled area to initiate some motion activity which will reset the controller and thereby avoid shutoff of lighting.

SUMMARY OF THE INVENTION

According to the automatic lighting controller of the present invention, a lighting load can be turned on/off manually and can be turned off automatically in response to the lack of motion activity within a controlled area. In the automatic mode of operation, an infrared sensor detects infrared thermal energy associated with motion activity of a person within the controlled area served by the lighting load. A logic control circuit applies a turn-off control signal to a gate controlled power switch for switching off the lighting when a timer circuit determines that motion activity above a threshold level has not occurred within the controlled area during a prescribed interval. The control circuit includes a counter which produces a grace period count signal and a reset count signal, with the grace period count signal occurring within a predetermined sub-interval, for example, the duration of one count cycle prior to the reset count signal.

In the preferred embodiment, the predetermined subinterval grace period corresponds with the cycle interval of the (N−1) COUNT of an N-state counter. The grace period count cycle (N−1) interval is adjustable, for example, from about 0.6 second to about 15 seconds. The 0.6 second grace period is for test purposes only; longer grace periods of from about 7 seconds to about 15 seconds are preferred for normal operation. The grace period count signal enables an audio transducer which provides an audible alert that the lights are about to be switched off automatically. A person in the controlled area can override the impending automatic shut-off simply by initiating some motion activity during the grace period.

Operational features and advantages of the present. invention will be appreciated by those skilled in the art upon reading the detailed description which follows with reference to the accompanying drawings.

DETAILED DESCRIPTION OF THE PREFERRED EMBODIMENT

Figure 1:
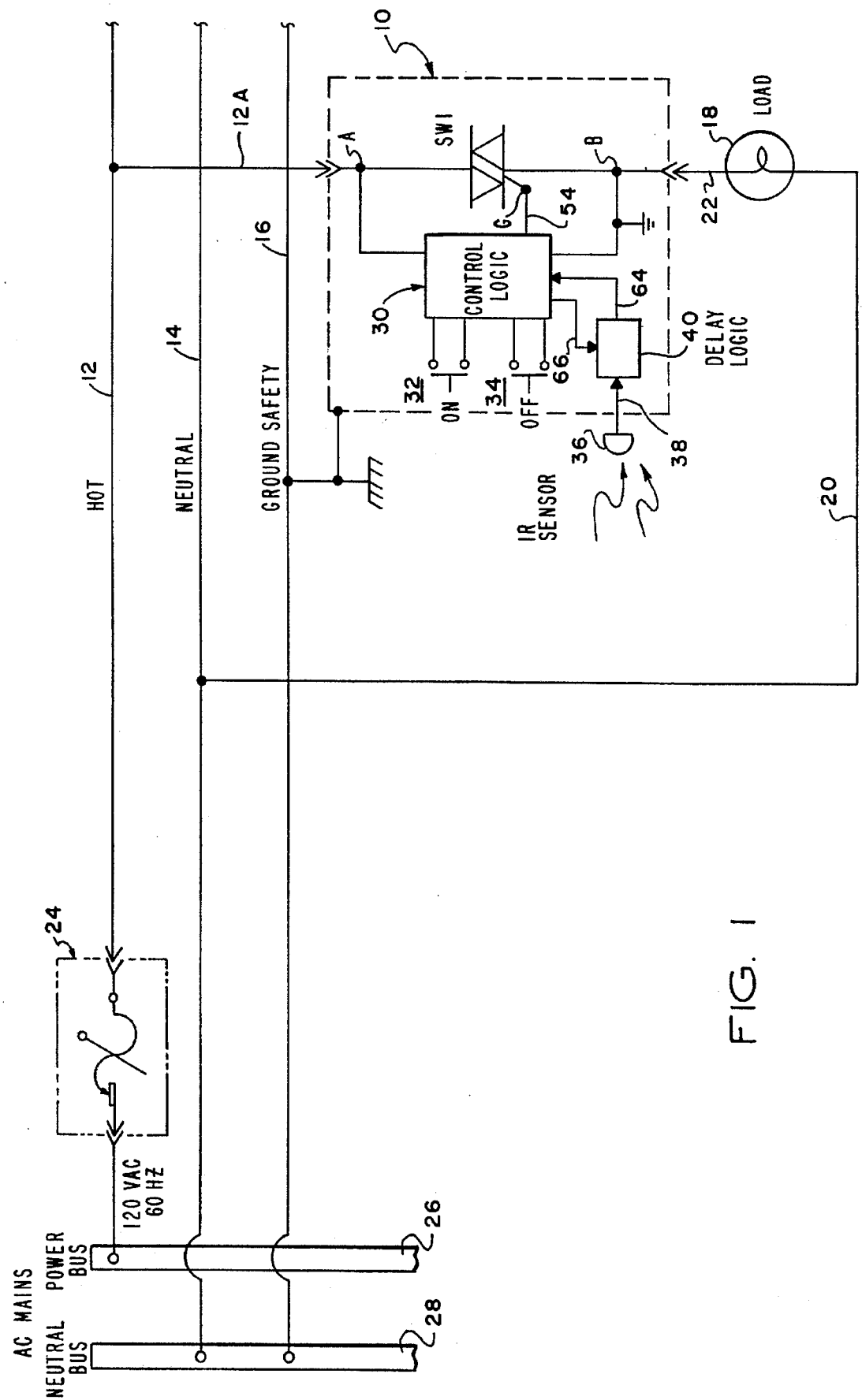
FIG. 1 is a simplified schematic diagram of a lighting control system having an automatic power switch controller constructed according to the teachings of the present invention.

Referring now to FIG. 1, the automatic lighting controller 10 of the present invention derives its operating power from the hot, neutral and ground safety power conductors 12, 14 and 16, respectively, of a 120 VAC, 60 Hz single phase AC power source. The controller 10 controls the application of operating power to an incandescent lamp 18. According to conventional AC wiring practice, one terminal of the incandescent lamp 18 is connected to the neutral supply conductor 14 by a load conductor 20, and the other terminal of the lamp 18 is connected to the switched terminal of a power switch SW1 by a load conductor 22. Preferably, the power switch SW1 is a triac. However, other gate controlled switching devices such as a silicon controlled rectifier may be used as a substitute for the triac.

Operating power is conducted through a thermal circuit breaker 24 which connects the hot conductor 12 to the AC power bus 26. Load current is conducted through a HOT extension conductor 12A to the unswitched terminal A of the triac switch SW1. Load current is returned from the switched terminal B of the triac switch SW1 through the load conductor 20 and neutral conductor 14 to the neutral bus 28. According to conventional practice, the ground safety conductor 16 is also electrically connected to the AC neutral bus and is extended in parallel with the hot conductor 12 along the distribution path for safety purposes.

The automatic lighting controller 10 of the present invention includes a control logic circuit 30 and manual switches 32, 34. The manual switches 32, 34 are momentary contact switches designated ON and OFF, respectively.

Additionally, the automatic controller 10 includes an infrared motion sensor 36 which produces an analog output signal 38 in response to motion activity within a controlled area. The analog signal 38 is input to a delay logic circuit 40 which, acting in combination with the control logic circuit 30, automatically turns off the lamp load 18 in the absence of motion activity over a predetermined period of time, for example, after everyone has left the room.

The motion sensor 36 may be constructed as disclosed in U.S. application Ser. No. 07/484,066, filed Feb. 23, 1990, entitled "PRESET LIGHT CONTROLLER INCLUDING INFRARED SENSOR OPERABLE IN MULTIPLE LOADS", assigned to the assignee of the present invention, and which is incorporated herein by reference. Accordingly, the automatic controller 10 is operable in an automatic mode wherein the turn-off function is produced automatically by the infrared motion sensor 36 and the delay logic circuit 40.

Figure 2:
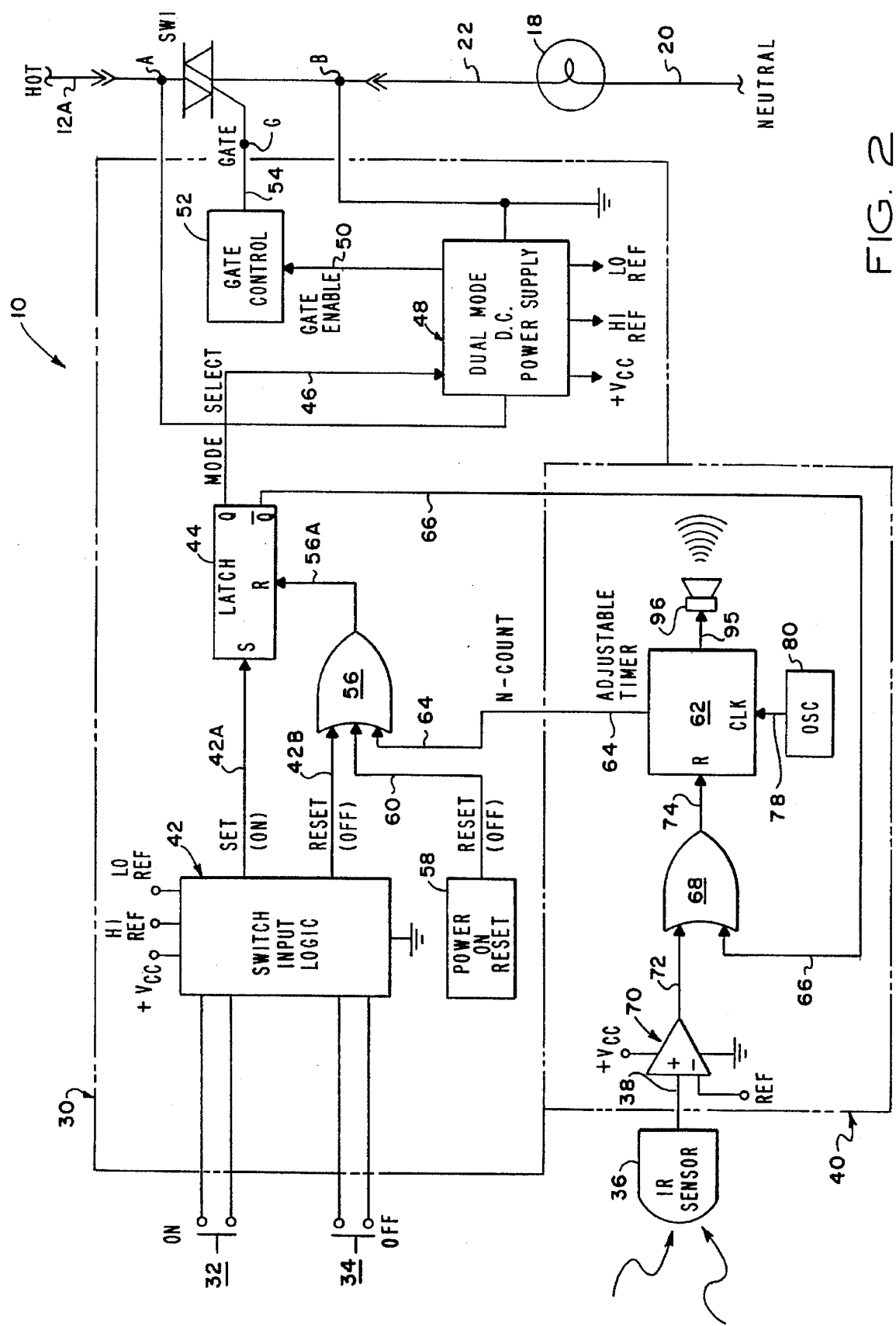
FIG. 2 is a simplified block diagram of the automatic controller shown in FIG. 1.

Referring now to FIG. 2, turn-on and turn-off control signals are initiated manually by the momentary contact switches 32, 34 which form inputs to a switch input logic circuit 42. The switch input logic circuit 42 is preferably constructed as disclosed in co-pending U.S. Application Serial No. 07/752,004, filed Aug. 29, 1991, entitled "LIGHTING CONTROL SYSTEM WITH SET/RESET GROUND REMOTE", by William Randall Erwin, which is incorporated herein by reference. In response to closure of the ON switch 32, a logic high SET control signal 42A is generated. In response to closure of the OFF switch 34, a logic high RESET control signal 42B is generated.

The SET control signal is applied to the SET (S) input of an SR latch 44. The Q output of the SR latch 44 produces a logic high MODE SELECT signal 46 to the mode select input of a dual mode power supply 48. The dual mode power supply 48 produces a GATE ENABLE signal 50 and a gate control circuit 52 applies a turn-on GATE signal 54 to the gate G of the triac power switch SW1 when the MODE SELECT signal 46 is logic high. When the triac power switch SW1 conducts, AC operating power is conducted from the hot power conductor 12 through the extension conductor 12A to the switched load conductor 22, thereby energizing the lamp load 18, with current being returned to the neutral power conductor 14 through the load conductor 20.

Upon actuation of the momentary contact OFF switch 34, the logic high RESET (OFF) control signal 42B is produced. The RESET (OFF) output signal 42B of the switch input logic circuit 42 is connected to one input of an OR gate 56. A POWER ON reset circuit 58 produces a RESET (OFF) signal 60 in response to initial turn-on which is also applied to one input of the OR gate 56. The motion detector delay logic circuit 40 includes an adjustable timer 62 which produces an N-count time out signal 64 in the absence of an IR sensor signal 38 which does not rise above a predetermined threshold level during a prescribed time interval, for example, 6 minutes which is manually adjustable in the timer 62. The N-count time out signal 64 is applied as one input to the OR gate 56.

Accordingly, assuming that the master control switch SW1 is conducting, a reset pulse 42B from the switch input logic circuit 42 or from the N-count timeout signal 64 produced by the timer circuit 62 of the delay logic circuit 40, or from the POWER ON reset circuit 58 will produce a logic high level on the output 56A of the OR gate 56 which will cause the latch 44 to reset and turn off the master control switch SW1. The SR latch 44 has a logic Q output 46 and a complement logic $\overline{Q}$ output 66. The logic Q output. 46 is the MODE SELECT signal which has a logic high and a logic low value. The complement latch $\overline{Q}$ output 66 is a RESET signal which has a logic high and logic low value. The complement $\overline{Q}$ RESET signal 66 forms one input to an OR gate 68 in the delay logic circuit 40.

Referring again to FIG. 2, the IR sensor output signal 38 is applied to the non-inverting (+) input of a comparator 70. Turn-off of the triac power switch SW1 is accomplished automatically in the absence of motion activity by the IR motion sensor 36 and the delay logic circuit 40. The IR motion sensor 36 produces an analog voltage signal 38 from an infrared sensor element whose impedance varies in response to a change in infrared energy level. The analog voltage signal 38 is input to the non-inverting (+) terminal of the comparator 70, which preferably is a single supply comparator, for example, National LM 358. A reference voltage REF is applied to the inverting terminal (−) of the comparator 70. When the analog output signal 38 of the infrared sensor 36 becomes more positive than the reference voltage REF, the comparator output 72 transitions from logic 0 to logic 1. The output 72 of the comparator 70 is applied as one input to the OR gate 68.

Figure 3:
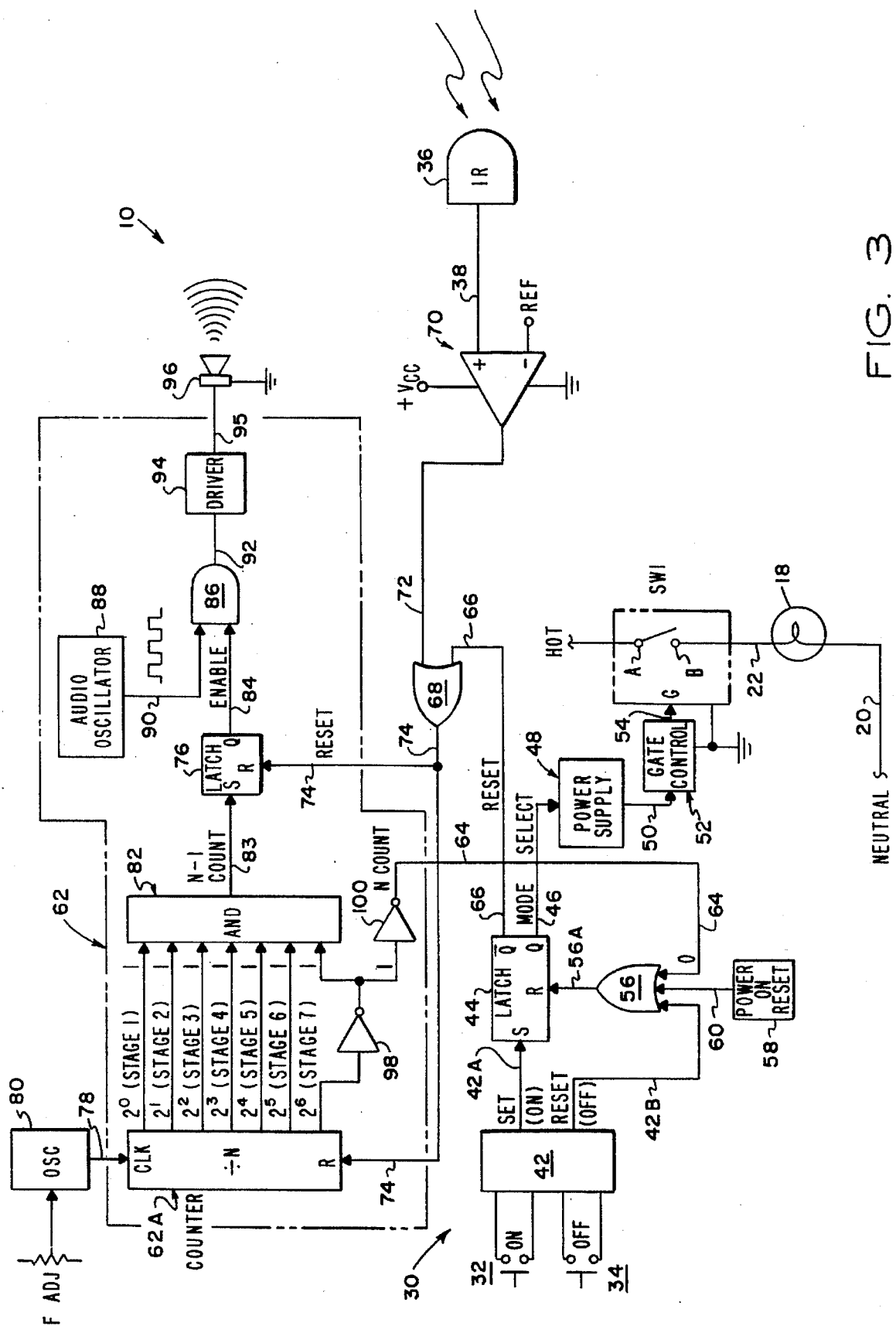
FIG. 3 is a simplified block diagram of the motion sensor circuit shown in FIG. 1; and, FIG. 4 is a flow chart illustrating the logical operation of an automatic lighting control circuit constructed according to the present invention.

Referring now to FIG. 3, the timing circuit 62 includes a seven-stage ripple counter 62A. The counter 62A in this embodiment produces a clock pulse count of N, with the N−1 COUNT ($2^6$−1) being 63, and the N-count ($2^6$) being 64.

The OR gate 68 has an output 74 which is applied to the reset input R of the counter 62A and to the reset input R of an SR latch 76 in the timing ciructi 62. By this arrangement, the counter 62A is reset each time the infrared sensor 36 produces an output signal 38 great enough to cause the comparator output 72 to transition. The counter 62A receives as its input an oscillato signal 78 from a variable frequency, free-running oscillator 80. The free-running oscillator 80 operates at an adjustable frequency F. The oscillator frequency F, the counter 62A and decode logic are selected to produce a predetermined time delay, for example, fifteen minutes. That is, if the reference threshold REF of the comparator 70 is not exceeded by the output signal 38 of the infrared sensor 36 over any fifteen minute interval, the counter 62A will produce a digital output signal upon a count of N−1 clock pulses 78 which is input to an AND gate decoder 82. The decoder 82 produces an (N−1) COUNT output signal 83 which is input to the SET terminal (S) of the SR latch 76. The Q output of the SR latch 76 produces an enable signal 84 which forms one input of an AND gate 86. An audio oscillator 88 produces an audio frequency signal, for example, 10K Hz, on its output 90. The audio output signal 90 forms a second input to the AND gate 86. According to this arrangement, when the ENABLE signal 84 is logic high, the audio oscillator signal 90 is conducted first to the AND gate output 92 and then to the input of an audio transducer driver 94. The transducer driver 94 produces an amplified signal 95 which energizes an audio transducer 96 for the duration of the (N−1) COUNT signal 83.

After termination of the (N−1) COUNT, the counter 62A next completes its Nth count cycle and produces the N-count reset signal 64. That is, unless some motion activity is detected during the grace period of the (N−1) COUNT interval, the reset signal 64 of the counter 62A will be applied to the OR gate 56, thereby driving its output 56A to logic high and resetting the SR latch 44. Upon reset, the Q output of the SR latch 44 transitions to logic low and its complement $\overline{Q}$ output transitions to logic high. Upon transition of the MODE SELECT signal 46 to logic low, the triac power switch SW1 is turned off.

The SR latch 44 functions logically as an ON/OFF flip-flop. The RESET signal 66 is taken from the complement $\overline{Q}$ output of the SR latch 44, which means that in the power switch SW1 ON state, Q is logic "low" (active low output). Whenever the SR latch 44 is in the system OFF state (Q high), the OR gate 68 output 74 remains high without regard to the state of the comparator output 72. This maintains a constant logic high RESET signal 74 on the reset input R of the counter 62A which is the desired condition when the system is off.

Whenever the SR latch 44 is in the ON state, the complement $\overline{Q}$ is logic low and the RESET output 74 of the OR gate 68 simply tracks the comparator output 72 state, thereby resetting the counter 62A only when motion activity which exceeds the reference level is detected.

Referring again to FIG. 3, the delay logic circuit 40 automatically resets in response to a logic high condition on the output 74 of the OR gate 68. As previously described, this condition would also be obtained in response to a RESET signal from the output 42B of the switch input logic circuit 42, from the POWER ON reset circuit 58 or from the N-count signal 64, which would indicate that no motion activity exceeding a predetermined reference level had been detected within the predetermined counting interval of the counter 62. For typical applications, the count interval is adjustable from about ½ minute up to 15 minutes. In the timing circuit shown in FIG. 3, the counter 62A is a seven stage ripple counter, with the N−1 COUNT signal 83 being produced by the first six stages. For a 15 minute time delay as measured from the last detectable motion activity until the onset of the audible alert signal produced by the transducer 96, the frequency is given by the desired time delay in seconds (900) divided by the count, 64 ($2^6$). This yields a 14 second grace period corresponding to F=0.07 Hz. That is, the cycle duration of each count in this example is 14 seconds, thereby providing a grace period duration of 14 seconds for the N−1 COUNT (63 clock pulses) signal 83.

The AND gate decoder 82 produces the N−1 COUNT when the first six stages are at binary level 1, and the 7th stage is at binary 0. The 7th stage remains at binary 0 during the cycling through the first six stages, and its binary 0 output is inverted to binary logic 1 by an inverter 98. By this arrangement, as soon as the first six stages have cycled through a binary count of 63 ($2^6$−1), all inputs of the AND gate decoder 82 are logic 1, thereby producing a binary logic 1 value for the N−1 COUNT signal 83. This of course sets the SR latch 76 and enables the audio oscillator signal 90 to be applied to the audio transducer 96. Consequently, the transducer 96 emits an audible alarm signal for the duration (14 seconds) of the N−1 COUNT.

Upon the Nth count ($2^6$), the 7th stage input to the AND gate 82 transitions to logic 0, thereby producing a logic 0 signal on the input to the SR latch 76. At the same time, the output of the inverter 98 is inverted once again through a second inverter 100, thereby producing a logic 1 level on the N-count RESET signal 64. The N-count RESET signal 64 resets the SR latch 44 thereby driving its complement $\overline{Q}$ reset output signal 66 to a logic high level. This produces a logic high level reset signal 74 at the reset input of the counter 62A and at the reset input of the SR latch 76. Thus the count of the seven stage ripple counter 62A is reset, and the Q output of the SR latch 76 transitions from logic 1 to logic 0, thereby terminating the audible alert.

Figure 4:
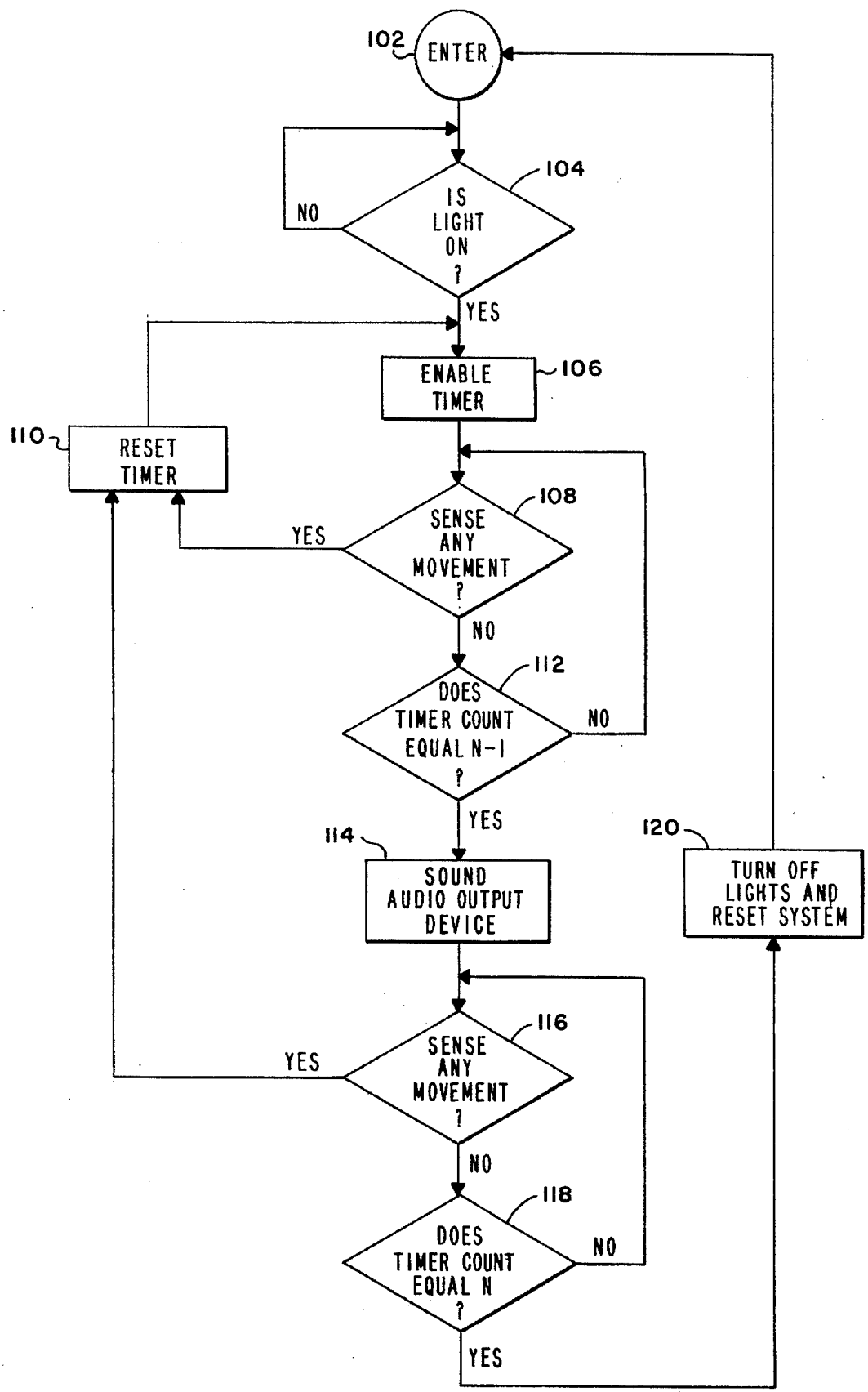

Referring now to FIG. 4, the control sequence begins at entry step 102 at which time the manual ON switch 32 is depressed. At step 104, a determination is made as to whether the lamp 18 has been energized. If the lamp 18 has not been energized, the system continues in the recirculation mode with the reset signal 74 being constantly applied to the reset input R of the N-state counter 62A. If the lamp 18 has been turned on, then the count sequence of the timer 62 is enabled in step 106. Operation of the controller 10 then moves to step 108 at which a determination is made as to whether movement which exceeds the threshold has been detected by the infrared sensor 36 and comparator 70. If motion activity has been detected, the timer 62 is reset at step 110 and the operation is then moved back to step 106 to reset the timer count. If there is no movement detected, the system then moves to step 112 where a determination is made whether the timer count equals N−1. If the timer count does not equal N−1, the system recirculates to step 108 to determine whether motion has been sensed. The previous loops are executed again and again until the timer count is equal to N−1.

If the timer count equals N−1, the audio transducer 96 is energized at step 114, thereby providing an audible alert that the counter 62A is operating within the grace period (14 seconds.) and that the light 18 will be switched off automatically at the end of the grace period. Concurrently while the audio transducer is being energized during the grace period, the controller 10 determines at step 116 if any motion activity has been sensed during the grace period. If so, the controller returns to the previous step 110, and resets the counter 62A, whereupon the previous loops are executed again and again until no movement during the grace period is detected.

Upon completion of the N−1 grace period, the controller moves to step 118 in which a determination is made as to whether the timer count equals N. If the timer count does not equal N, the program recycles to step 116 and the preceding loops are re-executed. If the answer is yes, the system 10 executes step 120 by conducting a reset signal 56A to the SR latch 44 which turns off the light 18, resets the counter 62A and returns to the enter step 102.

Although the invention has been described with reference to a specific embodiment, the foregoing description is not intended to be construed in a limiting sense. Various modifications to the disclosed embodiment, as well as alternative applications of the invention, will be suggested to persons schooled in the art by the foregoing specification and illustration. It is therefore contemplated that the appended claims will cover any such modifications, applications or embodiments as fall within the true scope of the invention.

What is claimed is:

1. An automatic lighting controller for applying electrical power to a lighting load from a power distribution circuit in which the lighting load is selectively connectable to the power distribution circuit through a gate controlled power switch, said automatic lighting controller comprising a circuit for controlling the ON/OFF operation of the gate controlled power switch, means for detecting motion activity above a prescribed threshold level which occurs within an area served by the lighting load during a first time interval, means responsive to the motion detection means for causing the control circuit to maintain the gate controlled power switch in the ON condition in response to the detection of motion activity in the service area during the first time interval, means for operating an audible alert output device during a second time interval subsequent to the first time interval if motion activity above the threshold level is not detected during the first time interval, and means responsive to the motion detection means for causing the control circuit to switch OFF the gate controlled power switch if motion activity above the threshold level is not detected during the second time interval;

wherein said circuit for controlling the ON/OFF operation of the gate controlled power switch comprises:

a switch logic circuit for generating a SET control signal in response to a turn-on input signal and for generating a RESET control signal in response to a turn-off input signal;

a delay logic circuit including a resettable counter for generating a first count signal upon completion of a count sequence corresponding in duration with the first time interval, the first count signal output of the resettable counter being coupled to the audible alert output device operating means for enabling the audible alert output device during the second time interval if motion activity above the threshold level is not detected during the first time interval, and for generating a second count signal if motion activity above the threshold level is not detected during the second time interval; and, latch means having a SET input and a RESET input coupled to the SET and RESET outputs, respectively, of the switch logic circuit and having its RESET input coupled to the second count signal output of the delay logic circuit, said latch means having a first binary logic output coupled to the control circuit for enabling a gate turn on signal to the power switch in response to a logic high SET control signal from the switch logic circuit, and having a complement binary logic output for applying a logic high RESET signal to the reset input of the resettable counter in response to a turn-off RESET control signal from the switch logic circuit or in response to a RESET signal generated by the motion detection means.

2. An automatic lighting controller as defined in claim 1, said counter circuit comprising a counter having multiple stages capable of counting a sequence of N clock pulses and including decoder means coupled to the counter outputs, said decoder means being operable to produce a first output signal corresponding with the count of the N−1 clock pulse, and said decoder means being operable for producing a second output signal corresponding with the count of the Nth clock pulse.

3. An automatic lighting controller as defined in claim 2, said decoder means comprising:

an AND gate circuit having multiple inputs corresponding in number with the number of multiple stages of said counter, with the outputs of said counter stages being coupled to the inputs of said AND gate.

4. An automatic lighting controller as defined in claim 3, said decoder means further comprising:

a first inverter coupled between the output of the last stage of said counter to the corresponding input of said AND gate; and, a second inverter coupled to the output of the first inverter, wherein the output of the second inverter produces a logic high RESET signal upon a count of N by the last stage of said counter.

5. An automatic lighting controller for applying electrical power to a lighting load from a power distribution circuit in which the lighting load is selectively connectable to the power distribution circuit through a gate controlled power switch, said automatic lighting controller comprising, in combination:

a gate circuit for controlling the ON/OFF operation of the power switch;

a switch logic circuit for generating a SET control signal in response to a turn-on input signal and for generating a RESET control signal in response to a turn-off input signal;

a motion detector for generating an electrical analog output RESET control signal in response to motion activity above a prescribed threshold level which occurs within an area served by the lighting load during a first time interval;

an audible alert circuit including an output transducer for producing an audible alarm signal;

a delay logic circuit including a resettable counter for generating a first count signal upon completion of a count sequence corresponding in duration with the first time interval, the first count signal output of the resettable counter being coupled to the audible alert circuit for enabling the output transducer during a second time interval subsequent to the first time interval if motion activity above the threshold level is not detected during the first time interval, and for generating a second count signal if motion activity above the threshold level is not detected during the second time interval; and, latch means having a SET input and a RESET input coupled to the SET and RESET outputs, respectively, of the switch logic circuit and having its RESET input coupled to the second count signal output of the delay logic circuit, said latch means having a first binary logic output coupled to the gate control circuit for enabling a gate turn-on signal to the power switch in response to a logic high SET control signal from the switch logic circuit, and having a complement binary logic output for applying a logic high RESET signal to the reset input of the resettable counter in response to a turn-off RESET control signal from the switch logic circuit or in response to a RESET signal generated by the motion detector.

6. An automatic lighting controller as defined in claim 5, said counter having multiple stages capable of counting a sequence of N clock pulses and including decoder means coupled to the counter outputs, said decoder means being operable to produce a first output signal corresponding with the count of the N−1 clock pulse, and said decoder means being operable for producing a second output signal corresponding with the count of the Nth clock pulse.

7. An automatic lighting controller as defined in claim 5, said decoder means comprising:

an AND gate circuit having multiple inputs corresponding in number with the number of multiple stages of said counter, with the outputs of said counter stages being coupled to the inputs of said AND gate.

8. An automatic lighting controller as defined in claim 7, said decoder means further comprising:

a first inverter coupled between the output of the last stage of said counter to the corresponding input of said AND gate; and, a second inverter coupled to the output of the first inverter, wherein the output of the second inverter produces a logic high RESET signal upon a count of N by the last stage of said counter.

* * * * *